UNITED STATES PATENT OFFICE.

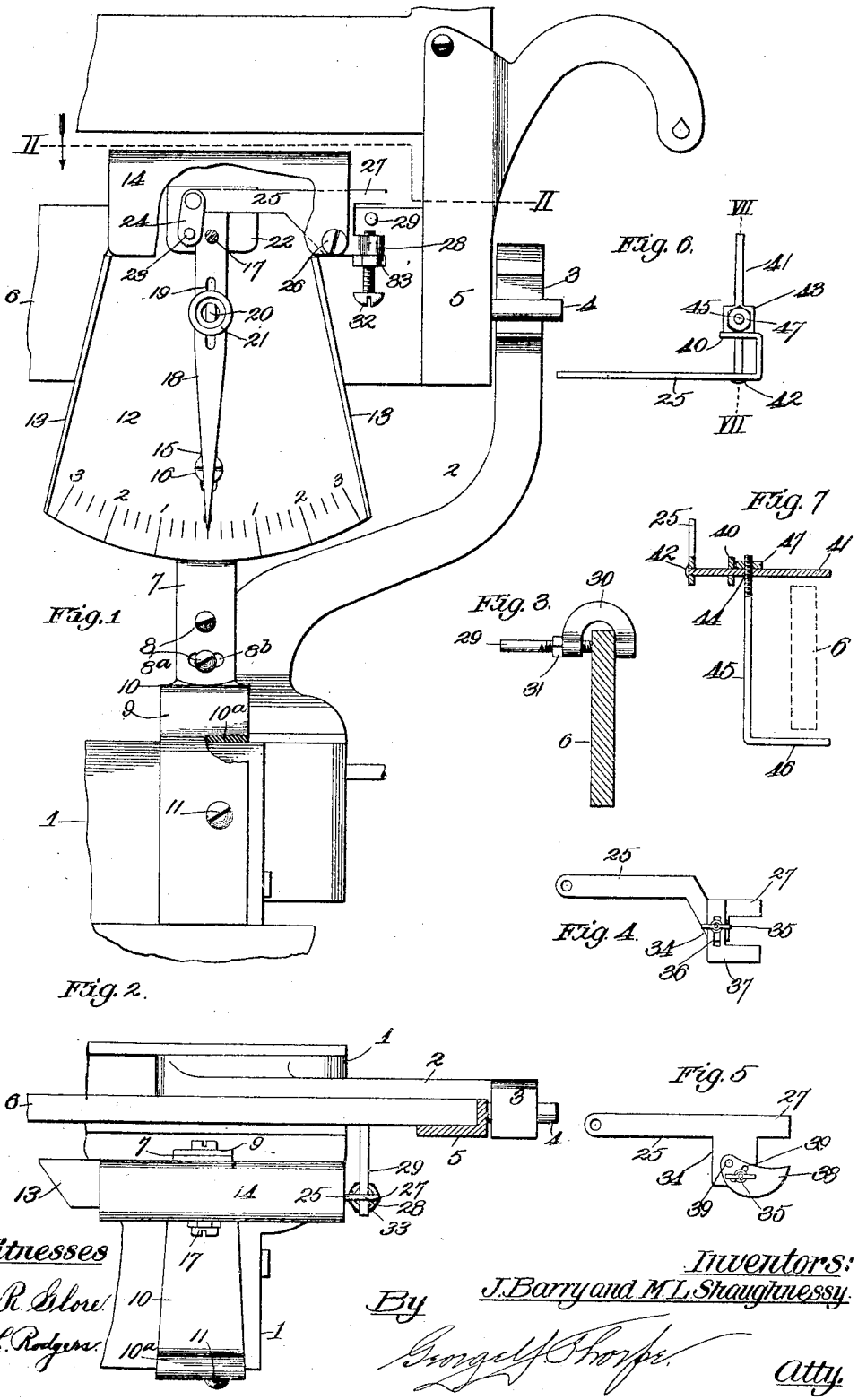

JOHN BARRY AND MICHEAL L. SHAUGHNESSY, OF WESTPHALIA, KANSAS.

INDICATOR FOR WEIGHING-SCALES.

No. 805,518.　　　　　Specification of Letters Patent.　　　　　Patented Nov. 28, 1905.

Application filed May 2, 1905. Serial No. 258,516.

*To all whom it may concern:*

Be it known that we, JOHN BARRY and MICHEAL L. SHAUGHNESSY, citizens of the United States, residing at Westphalia, in the county of Anderson and State of Kansas, have invented certain new and useful Improvements in Indicators for Weighing-Scales, of which the following is a specification.

Our invention relates to weighing-scales of that character which compute the money value of the article weighed and which are equipped with attachments to indicate how much in money value the article being weighed exceeds or falls below the proper amount; and our object is to produce attachments of this character which operate automatically and reliably, may be adjusted to compensate for wear to insure accurate operations, which are of simple, durable, and inexpensive construction, and which can be applied easily and quickly to computing-scales now on the market.

To this end the invention consists in certain novel features of construction and combinations of parts, as hereinafter described and claimed, and in order that it may be fully understood reference is to be had to the accompanying drawings, in which—

Figure 1 is a rear face view of the right-hand end of a grocer's computing-scale equipped with an over and under weight attachment embodying our invention, the attachment being broken away to more clearly disclose certain features of construction. Fig. 2 is a horizontal section taken on the line II II of Fig. 1. Fig. 3 is a vertical section of a beam of the scale equipped with a detachable pin for operating in connection with the overweight and underweight computer and indicator attachment. Fig. 4 is a side view of the lever forming a part of the attachment and provided with an adjustable device of different construction from that shown in Fig. 1. Fig. 5 is a side view of said lever equipped with a second modification of the adjustable device. Fig. 6 is a top plan view of said lever of slightly-modified form and equipped with a bar to overlie the beam of the scale and an arm to underlie such beam. Fig. 7 is a section on the line VII VII of Fig. 6.

In the said drawings, 1 indicates the usual traveling frame forming a part of an ordinary grocer's computing-scale, and 2 an angular arm, secured to or cast therewith and provided with a vertical recess or slot 3, into which projects a pin 4, projecting from the end bar 5, rigidly secured to and connecting the usual scale-beams, only two of said beams appearing and but one numbered, as at 6. Said beams and bar 5 constitute what is hereinafter termed the "scale-beam frame," the same being balanced in the customary manner. (Not shown.) With this class of scale the outward adjustment of the poise (not shown) of course depresses the end of the beam until pin 4 strikes the bottom of recess or slot 3, the beam moving upward as the commodity placed on the scale closely approaches the weight necessary to counterbalance the poise. When the weight of the poise is counterbalanced, the pin occupies the position shown in Fig. 1, and when the weight overbalances the poise the pin of course rises above the position indicated. To insure that the customer shall receive full value for the money paid and at the same time expedite the weighing operation, so that the salesman shall not lose any unnecessary time, we have provided the attachment which begins to operate just before full weight is placed upon the scale in order to show the money value of the difference between the weight of the commodity at that time on the scale and the weight which should be there to counterbalance the beam, and thus enable the salesman to more accurately gage the additional quantity which must be placed upon the scale to balance the beam. By thus warning the salesman that the quantity which is first placed on the scale lacks only a few cents' worth of the quantity which should be placed thereon the weighing operation is facilitated. Furthermore, by indicating the money value of the excess or deficiency of the commodity being weighed over or under the proper weight, respectively, the necessity for accurate weighing is determined, as accurate weighing of cheap commodities is not as essential as accurate weighing of the expensive commodities, especially during the rush hours of the day.

Referring to the drawings, 7 indicates a standard rising from and pivoted for lateral movement by cap-screws 8 to an angle-bracket 9, a clamping-screw $8^a$ extending through a segmental slot $8^b$ of the standard and into the bracket 9 to clamp the former rigidly after being adjusted to relatively plumb the dial-plate and index-finger, hereinafter described. The bracket 9 has its horizontal arm 10 formed with a depressed portion or shoulder 10ª, resting upon the upper edge of frame 1 (which may be a stationary part in some types of scale) to coöperate with cap-screws 11 on holding the bracket rigidly in position, the cap-screws extending through the bracket and engaging the frame. A dial-frame 12, of sheet metal, is provided with downwardly-diverging side walls 13 and a return-bend or gooseneck top portion 14, and said frame is arranged vertically against the rear side of standard 7 and is provided with vertical slots 15, one only of which appears, through which screw-bolts 16, carried by the standard, extend for the purpose of clamping said frame at the desired point of adjustment, said frame being made adjustable on the standard in order to accommodate scales of varying proportions. Only a single screw-bolt 16 appears, the other being hidden by the index-finger, hereinafter referred to.

17 indicates an arbor mounted in the top portion of the frame and forming a pivot for the index-finger 18. Said finger when the scale is balanced depends vertically and registers with "0," the central mark of the dial marks or indicia of the plate, said marks being disposed concentrically of pivot 17 and being marked both ways from "0" upward. When the commodity being weighed is worth sixteen cents or more per pound, the division-marks represent cent values; but when the commodity is valued at fifteen cents or less per pound said marks represent quarter-cent values, it being understood, of course, that the marking of the dial corresponds to that (not shown) of the scale proper, in which one of the beams above beam 6 shows values of fifteen cents or less and the other beam (not shown) values of sixteen cents or more per pound.

The index-finger is provided with a longitudinal slot 19, through which extends screw-bolt 20, engaged by a clamping-nut 21. After slightly unscrewing said nut the weight can be adjusted along the length of said slot and resecured at the point desired by the opposite manipulation of the nut. This adjustment of the screw and nut up or down, respectively, increases or diminishes the leverage of the scale-beam on said finger, and the particular advantage derived from said adjustable weight is to vary the leverage on the finger, so that it shall instantly respond to the movement of the beam of any scale to which the attachment is applied—that is, to the movement of the beam when applying pressure on a lever, hereinafter described. As such pressure decreases on the lever the hand swings by force of gravity toward the "0" point of the dial.

22 indicates a plate secured on the upper end of the finger, and 23 a pivot-pin carried thereby inward or to the left of the finger, said pin being pivotally connected by link 24 with the inner end of a lever 25, mounted on pivot 26, carried by the dial-framework. In Fig. 1 the lever 25 is preferably widened and bifurcated at its rear end, so as to provide the arms 27 and 28, one to overlie and the other to underlie a pin 29, which may be rigidly secured to the beam 6, as in Fig. 1, or may be detachably secured to the same, as in Fig. 3, the last-named figure showing an inverted-U-shaped frame 30, carrying pin 29 in the form of a clamping-screw, so that when screwed home the beam will be clamped rigidly and the rear arm of the frame 30 and the screw may be kept from turning by the lock-nut 31, if desired.

32 is a set-screw mounted in arm 28 by preference and adapted for engagement with pin 29, an adjustable device being employed at its point in order to vary the distance between it and the opposite arm of the lever— in this instance arm 27. A lock-nut 33 locks said screw against accidental movement. The construction shown in Fig. 1 enables the operator by the widening or narrowing of the bifurcation of lever 25 to insure a movement of the lever induced by pin 29 at the proper time in order that there may be no lost motion, and therefore inaccurate indication on the part of the index-finger. In other words, if the underweight is exactly two ounces the proper adjustment of set-screw will cause the index-finger to register with the proper mark on the dial-plate. The set-screw therefore enables the operator to compensate for wear or lost motion otherwise produced.

In Fig. 4 lever 25 has a depending arm 34, carrying a set-screw 35, engaging the vertical slot 36 of a right-angle-shaped bracket 37, the lower arm of the latter being adapted to underlie pin 29 as a substitute for the adjustable device 32 of Fig. 1, arm 37 being adjustable vertically for the reason hereinbefore explained with reference to the device 32 and secured at the desired position of adjustment by the clamping-screw 35.

In Fig. 5, which illustrates a second modification, an arm 38 is pivoted, as at 39, to the depending arm 34 of lever 25, said pivoted arm having a segmental slot 39, through which clamping-screw 35 extends to clamp the pivoted arm at the desired distance from the overhanging arm 27.

Referring now to Figs. 6 and 7, it will be noticed lever 25 is provided with a return-bend 40, and journaled in said lever and return-bend portion 40 thereof is a bar 41, projecting rearwardly from beam 6, the front end of said bar having a head 42 to prevent it sliding rearward on the return-bend. Said rod is enlarged, as at 43, to prevent it working forward and also to permit of the formation therein of a threaded hole 44 to receive the upper threaded end of an angle-arm or hook 45, the lower arm or terminal 46 of the angle-arm or hook projecting below beam 6, and in this connection it will be noticed that space is left between the upper edge of beam 6 and bar 41 and the lower edge of said beam and arm 46 to accommodate the balancing movement of the beam. A lock-nut 47 engages the upper threaded end of the angle-arm or hook and rests upon the enlargement 43 of bar 41 to prevent said bar or hook working downward, and thus increasing the distance between its arm 46 and bar 41.

In the practical operation of weighing a commodity the poise of the scale is first "set" and as a result the outer end of beam 6 is depressed until pin 4 strikes the bottom of recess or slot 3, the index-finger 18 at the same time moving to the left until it is at that end of the dial indicia, this movement of the index-finger being caused under downward pressure of pin 29 on the adjustable device 32, 37, or 38 of Figs. 1, 4, and 5, respectively. In the construction shown by Figs. 6 and 7, with which pin 29 is not used, the beam 6 in its downward movement engages the arm 46 of the angle-arm or hook 45, and thereby swings the index-finger, as explained. As the weight of the commodity approaches that indicated by the position of the poise the upward movement of the beam begins and is attended instantly by movement of the index-finger to the right, said finger in its progress showing exactly the money value of the amount or quantity of the commodity which is lacking to make up the required weight. The movement of the index-finger instantly places the salesman on guard, so that he may avoid placing more than the required quantity on the scale, and thus if the commodity happens to be an expensive one be under the necessity of removing the excess. If an excess was placed on the scale, the overweight in money value would be noted at a glance by reference to the indicia of the dial-plate to the right of the "0" mark. In the busy hours of the day it would be cheaper to give a slight excess in weight of the cheaper commodities than to attempt to bring the scale to an exact balance, as sufficient time in the aggregate would be saved to wait on a large number of additional customers.

From the above description it will be apparent that we have produced an overweight and underweight computer and indicator possessing the features of advantage enumerated as desirable and which is obviously susceptible of modification in a number of particulars without departing from the principle of construction and operation involved.

Having thus described our invention, what we claim as new, and desire to secure by Letters Patent, is—

1. The combination with a weighing-scale, of an overweight and underweight computer and indicator, comprising a dial-frame containing indicia, an index-finger pivoted to said dial-frame to play back and forth across said indicia, a lever pivoted to the dial-frame and connected to operate the index-finger, means to cause the scale-beam to move the lever, and an adjustable device forming part of said means, and means for securing said device at the desired point of adjustment.

2. The combination with a weighing-scale, of an overweight and underweight computer and indicator, comprising a dial-frame containing indicia, an index-finger pivoted to said dial-frame to play back and forth across said indicia, a lever pivoted to the dial-frame and connected to operate the index-finger, an adjustable device carried by said lever, and a pin projecting from the scale-beam between the lever and said adjustable device.

3. The combination with a weighing-scale, of an overweight and underweight computer and indicator, comprising a dial-frame, containing indicia, an index-finger pivoted to said dial-frame to play back and forth across said indicia, a lever pivoted to the dial-frame and connected to operate the index-finger, an adjustable device carried by the lever, and a pin detachably carried by the beam and interposed between said lever and said adjustable device.

4. The combination with a weighing-scale, of an overweight and underweight computer and indicator, comprising a dial-frame containing indicia, an index-finger pivoted to said dial-frame to play back and forth across said indicia, a lever pivoted to the dial-frame and connected to operate the index-finger, a set-screw carried by said lever, and a pin projecting from the scale-beam between the lever and said set-screw.

5. The combination with a weighing-scale, of an overweight and underweight computer and indicator, comprising a dial-frame containing indicia, an index-finger pivoted to said dial-frame to play back and forth across said indicia, a lever pivoted to the dial-frame and connected to operate the index-finger, a set-screw carried by said lever, a pin projecting from the scale-beam between the lever and said set-screw, and a lock-nut engaging the set-screw to prevent it working accidentally toward said pin.

6. The combination with a weighing-scale, of an overweight and underweight computer and indicator, comprising a dial-frame containing indicia, an index-finger pivoted to said dial-frame to play back and forth across said indicia, a lever pivoted to the dial-frame and connected to operate the index-finger, means to cause the scale-beam to move the lever, means whereby the movement of the lever shall be made to follow more or less quickly the movement of the scale-beam, a standard secured to the dial-frame, and an angle-bracket secured to said standard and to the scale.

In testimony whereof we affix our signatures in the presence of two witnesses.

JOHN BARRY.
MICHEAL L. SHAUGHNESSY.

Witnesses:
PETE HINTZ,
A. F. HATTEN.